United States Patent
Takahashi et al.

(10) Patent No.: US 7,636,087 B2
(45) Date of Patent: Dec. 22, 2009

(54) PROGRAM, INFORMATION STORAGE MEDIUM, IMAGE GENERATION SYSTEM, AND IMAGE GENERATION METHOD

(75) Inventors: Tsuyoshi Takahashi, Kawasaki (JP); Keiko Iso, Yokohama (JP)

(73) Assignee: Namco Bandai Games, Inc., Tokyo (JP)

( * ) Notice: Subject to any disclaimer, the term of this patent is extended or adjusted under 35 U.S.C. 154(b) by 671 days.

(21) Appl. No.: 11/391,306

(22) Filed: Mar. 29, 2006

(65) Prior Publication Data

US 2006/0221076 A1    Oct. 5, 2006

(30) Foreign Application Priority Data

Mar. 31, 2005    (JP)    ............ 2005-102902

(51) Int. Cl.
*G06T 15/00* (2006.01)

(52) U.S. Cl. .......... 345/418; 345/592; 345/640; 463/32; 463/42; 348/159; 348/169

(58) Field of Classification Search ......... 345/418, 345/426, 428, 473, 474, 475, 592, 640; 463/31, 463/32, 33, 42; 348/159, 169
See application file for complete search history.

(56) References Cited

U.S. PATENT DOCUMENTS

| 6,774,901 B2 * | 8/2004 | Kohira et al. ........... 345/473 |
| 6,917,371 B1 * | 7/2005 | Nagoshi et al. .......... 345/640 |
| 7,004,839 B2 * | 2/2006 | Suzuki et al. ............ 463/42 |

FOREIGN PATENT DOCUMENTS

JP    A-2000-298733    10/2000

* cited by examiner

*Primary Examiner*—Phu K Nguyen
(74) *Attorney, Agent, or Firm*—Oliff & Berridge, PLC

(57) ABSTRACT

An image generation system generates an image of an object space viewed from a given viewpoint. When a contact event in which a first model object comes in contact with a second model object in the object space has occurred, height information of grid points corresponding to a contact plane of the first model object is fetched by referring to height map data in which height information of a surface of the first model object with respect to a given reference plane set for the first model object is set in a grid pattern, and vertices of a contact plane of the second model object arm moved based on the fetched height information of the grid points.

17 Claims, 16 Drawing Sheets

PROGRAM, INFORMATION STORAGE MEDIUM, IMAGE GENERATION SYSTEM, AND IMAGE GENERATION METHOD

Japanese Patent Application No 2005-102902, filed on Mar. 31, 2005, is hereby incorporated by reference in its entirety.

BACKGROUND OF THE INVENTION

The present invention relates to a program, an information storage medium, an image generation system, and an image generation method.

An image generation system (game system) has been known which generates an image viewed from a virtual camera (given viewpoint) in an object space (virtual three-dimensional space) in which an object such as a character is disposed. Such an image generation system is very popular as a system which allows the experience of so-called virtual reality.

In such an image generation system, it is desirable to realistically represent a mark formed on the ground by an object having a complicated unevenness, such as a tire or a shoe sole, in order to increase the virtual reality of the player.

In related-art technology, when representing tire tread marks on the ground, the tire tread marks are represented by texture mapping a mark image or representing shade (shading) based on a normal vector, for example. However, such related-art technology cannot provide a three-dimensional impression due to insufficient representation of tire tread unevenness.

SUMMARY

According to a first aspect of the invention, there is provided a program used for generating an image of an object space viewed from a given viewpoint, the program causing a computer to function as:

a contact event determination section which determines whether or not a contact event in which a first model object and a second model object come in contact in the object space has occurred; and a vertex shader section which moves vertices of a contact plane of the second model object with the first model object when the contact event determination section has determined that the contact event has occurred, wherein a given reference plane is set for the first model object, and height information of a surface of the first model object with respect to the reference plane is set in a grid pattern by using height map data; and wherein the vertex shader section fetches the height information of grid points corresponding to a contact plane of the first model object with the second model object by referring to the height map data, and moves the vertices of the contact plane of the second model object based on the fetched height information of the grid points.

According to a second aspect of the invention, there is provided a program used for generating an image of an object space viewed from a given viewpoint, the program causing a computer to function as:

a vertex shader section which, when a contact event in which a first model object and a second model object come in contact in the object space has occurred, fetches height information of grid points corresponding to a contact plane of the first model object by referring to height map data in which height information of a surface of the first model object with respect to a given reference plane set for the first model object is set in a grid pattern, and moves vertices of a contact plane of the second model object based on the fetched height information of the grid points.

According to a third aspect of the invention, there is provided a computer-readable information storage medium storing any of the above-described programs.

According to a fourth aspect of the invention, there is provided an image generation system which generates an image of an object space viewed from a given viewpoint, the image generation system comprising:

a contact event determination section which determines whether or not a contact event in which a first model object and a second model object come in contact in the object space has occurred; and a vertex shader section which moves vertices of a contact plane of the second model object with the first model object when the contact event determination section has determined that the contact event has occurred, wherein a given reference plane is set for the first model object, and height information of a surface of the first model object with respect to the reference plane is set in a grid pattern by using height map data; and wherein the vertex shader section fetches the height information of grid points corresponding to a contact plane of the first model object with the second model object by referring to the height map data, and moves the vertices of the contact plane of the second model object based on the fetched height information of the grid points.

According to a fifth aspect of the invention, there is provided an image generation system which generates an image of an object space viewed from a given viewpoint, the image generation system comprising:

a vertex shader section which, when a contact event in which a first model object and a second model object come in contact in the object space has occurred, fetches height information of grid points corresponding to a contact plane of the first model object by referring to height map data in which height information of a surface of the first model object with respect to a given reference plane set for the first model object is set in a grid pattern, and moves vertices of a contact plane of the second model object based on the fetched height information of the grid points.

According to a sixth aspect of the invention, there is provided an image generation method comprising:

determining whether or not a contact event, in which a first model object and a second model object come in contact in an object space, has occurred;

moving vertices of a contact plane of the second model object with the first model object when occurrence of the contact event has been determined;

setting a given reference plane for the first model object, and setting height information of a surface of the first model object with respect to the reference plane in a grid pattern by using height map data; and fetching the height information of grid points corresponding to a contact plane of the first model object with the second model object by referring to the height map data, and moving the vertices of the contact plane of the second model object based on the fetched height information of the grid points.

According to a seventh aspect of the invention, there is provided an image generation method comprising:

when a contact event in which a first model object and a second model object come in contact in the object space has occurred, fetching height information of grid points corresponding to a contact plane of the first model object by referring to height map data in which height information of a surface of the first model object with respect to a given reference plane set for the first model object is set in a grid pattern, and moving vertices of a contact plane of the second model object based on the fetched height information of the grid points.

DETAILED DESCRIPTION OF THE EMBODIMENT

Figure 1:
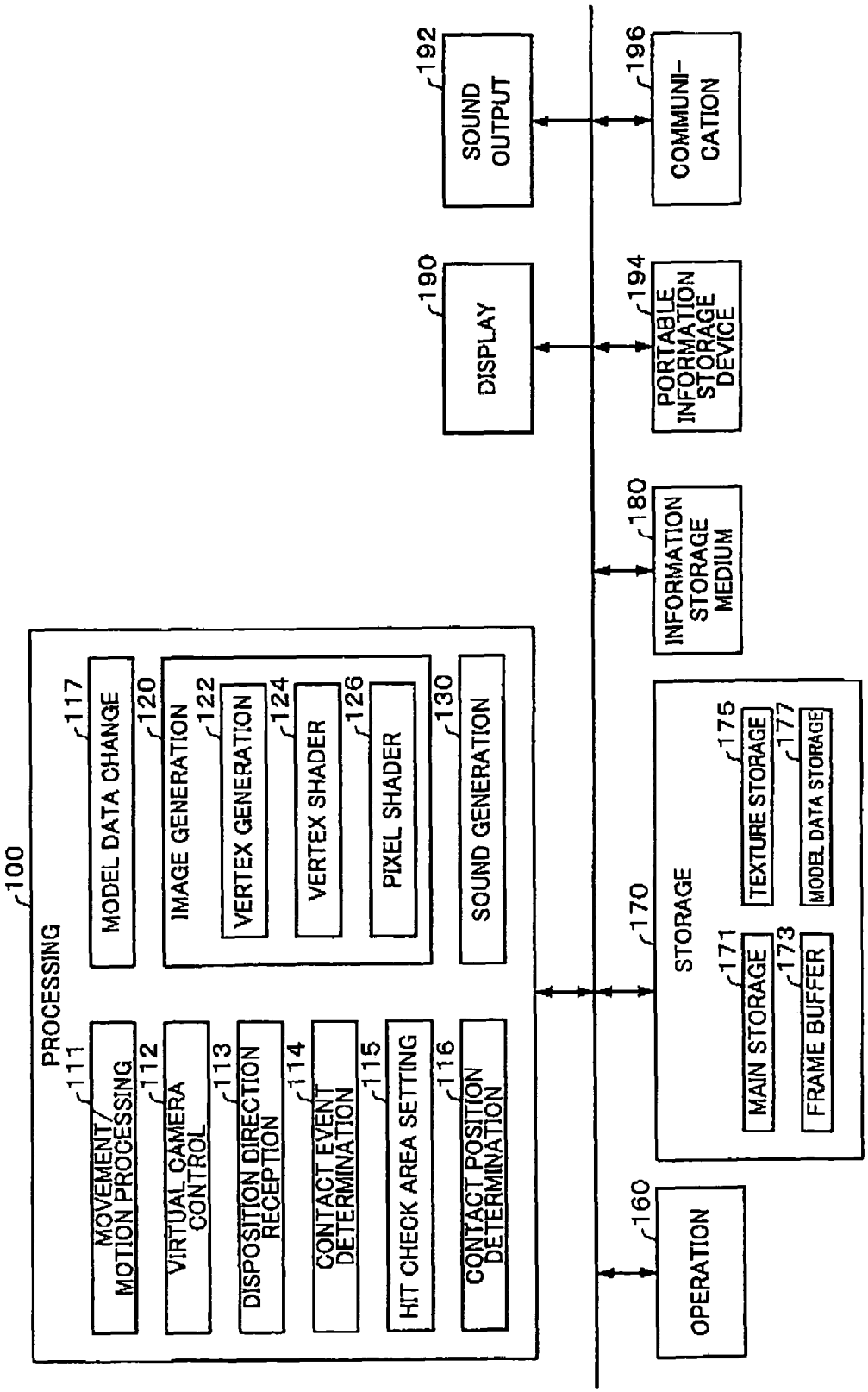
FIG. 1 is a functional block diagram of an image generation system according to one embodiment of the invention.

The invention may provide a program, an information storage medium, an image generation system, and an image generation method capable of realistically generating an image such as a mark remaining on the ground.

(1) According to one embodiment of the invention, there is provided an image generation system which generates an image of an object space viewed from a given viewpoint, the image generation system comprising:

a contact event determination section which determines whether or not a contact event in which a first model object and a second model object come in contact in the object space has occurred; and a vertex shader section which moves vertices of a contact plane of the second model object with the first model object when the contact event determination section has determined that the contact event has occurred, wherein a given reference plane is set for the first model object, and height information of a surface of the first model object with respect to the reference plane is set in a grid pattern by using height map data; and wherein the vertex shader section fetches the height information of grid points corresponding to a contact plane of the first model object with the second model object by referring to the height map data, and moves the vertices of the contact plane of the second model object based on the fetched height information of the grid points.

According to one embodiment of the invention, there is provided a program causing a computer to function as the above-described sections.

According to one embodiment of the invention, there is provided a computer-readable information storage medium storing a program causing a computer to function as the above-described sections.

According to these embodiments, when the contact event in which the first model object and the second model object come in contact has occurred, the mark of the first model object remaining on the second model object is represented by moving the vertices of the contact plane of the second model object. Specifically, according to this embodiment, an image which realistically represents the contact mark formed by the contact between the model objects can be generated by reflecting the shape (unevenness) of the contact plane of the first model object on the shape (unevenness) of the contact plane of the second model object.

(2) This image generation system may comprise:

a vertex generation section which generates new vertices of the second model object to increase the number of vertices when the contact event determination section has determined that the contact event has occurred, wherein the vertex shader section moves the vertices of the contact plane of the second model object including the new vertices generated by the vertex generation section so that the contact plane of the second model object is depressed corresponding to the contact plane of the first model object.

Each of the program and the information storage medium may cause the computer to function as the above vertex generation section and vertex shader section.

Therefore, even if the definition (degree of detail) of the second model object is low, the contact mark formed by the contact between the model objects can be represented in detail by generating new vertices to increase the number of vertices of the second model object.

(3) In each of the image generation system, the program, and the formation storage medium, the vertex generation section may generate the new vertices only in the contact plane of the second model object when the contact event determination section has determined that the contact event has occurred.

This enables the definition of the second model object to be locally increased by generating new vertices only in the area corresponding to the contact plane in which it is necessary to move the vertices. This reduces the calculation load during image generation processing and saves the memory capacity.

(4) In each of the image generation system, the program, and the information storage medium, the vertex generation section may generate the new vertices of the second model object only when a contact position of the first and second model objects is in a first distance range from the viewpoint.

This allows a detailed contact mark to be represented by generating new vertices only when the contact position of the model objects is in a specific distance range from the viewpoint. For example, new vertices may be generated only when the contact position is close to the viewpoint. This reduces the calculation load during image generation processing and saves the memory capacity.

(5) The image generation system may comprise: a model data change section which, when two or more pieces of second model object model data which differ in definition exist, changes the second model object model data to be fetched by the vertex shader section corresponding to a distance between the viewpoint and a contact position of the first and second model objects.

Each of the program and the information storage medium may cause the computer to function as the above model data change section.

In this feature, two or more pieces of data which differ in definition (degree of detail) are provided in advance as the model data which defines the second model object. The model data which defines the second model object is changed (switched) corresponding to the distance (positional relationship) between the contact position of the model objects and the viewpoint.

This enables generation of an image which represents the contact mark at an appropriate definition corresponding to the distance between the contact position of the model objects and the viewpoint. The model data may be changed for part or all of the vertices of the second model object.

(6) In each of the image generation system, the program, and the information storage medium, the model data change section may cause the vertex shader section to fetch the second model object model data with higher definition as the distance between the viewpoint and the contact position becomes shorter.

This allows a contact mark to be represented in detail using high definition model data when the contact position of the model objects is close to the viewpoint, and allows a contact mark to be simply represented using low definition model data when the contact position of the model objects is distant from the viewpoint.

(7) In each of the image generation system, the program, and the information storage medium, the model data change section may cause the vertex shader section to fetch the second model object model data with high definition instead of the second model object model data with low definition only when the contact position of the first and second model objects is in a first distance range from the viewpoint.

Since it suffices to change the model data of the second model object only when the contact event between the model objects has occurred in a specific distance range, the calculation load during image generation processing can be reduced, and the memory capacity can be saved.

(8) In each of the image generation system, the program, and the information storage medium when the contact position of the first and second model objects is in a second distance range further than the first distance range from the viewpoint, the vertex shader section may set an inverse vector of a normal vector of each vertex of the contact plane of the first model object as a normal vector of each of the vertices of the contact plane of the second model object.

When the contact position is in the second distance range farther than the first distance range from the viewpoint, the mark of the first model object remaining on the contact plane of the second model object is represented by changing the normal vector set for the vertices of the contact plane of the second model object. Specifically, when the contact event has occurred in a distance range distant from the viewpoint to a certain extent, the contact mark formed by the contact between the model objects is represented by bump mapping or normal mapping. Therefore, since it is unnecessary to perform the processing of moving the vertices of the model object, which imposes a high calculation load, the image generation processing speed can be increased.

(9) The image generation system may comprise:

a pixel shader section which performs texture mapping of a mark representation image on the contact plane of the second model object when the contact position of the first and second model objects is in a third distance range farther than the second distance range from the virtual camera.

Each of the program and the information storage medium may cause the computer to function as the above pixel shader section.

The pixel shader section performs texture mapping which reads a texture (image), associates texels and pixels, and determines the color of each pixel of the display screen. Specifically, when the contact event has occurred at a position sufficiently distant from the viewpoint, the contact mark formed by the contact between the model objects can be simply represented by texture mapping a mark representation image.

(10) In each of the image generation system, the program, and the information storage medium, the vertex shader section may switch two or more pieces of height map data which differ in the height information set for the grid point corresponding to movement information of the first model object, and move the vertices of the contact plane of the second model object.

The movement information of the first model object is information including the moving velocity of first model object when the first model object comes in contact with the second model object, the contact angle when the first model object comes in contact with the second model object, the entrance distance from the surface of the second model object, and the like. This allows generation of an image which realistically represents a mark corresponding to the contact state between the first model object and the second model object.

(11) In each of the image generation system, the program, and the information storage medium, the vertex shader section may switch two or more pieces of height map data which differ in a range of the contact plane corresponding to material information set for the second model object, and move the vertices of the contact plane of the second model object.

The material information of the second model object is information indicating the type (hard or soft) of the material for the second model object. According to this feature, the height map data with a narrow contact plane range is used when the contact plane of the second model object is formed of a hard material since the degree of deformation is small, and the height map data with a wide contact plane range is used when the contact plane of the second model object is formed of a soft material since the degree of deformation is large, whereby the contact mark formed by the contact between the model objects can be realistically represented.

(12) In the image generation system, the contact event determination section may determine that the contact event has occurred when a first hit check area set for the first model object and a second hit check area set for the second model object have a positional relationship in which the first hit check area overlaps the second hit check area; and the image generation system may include a hit check area setting section which, when the vertices of the contact plane of the second model object with the first model object have been moved by the vertex shader section, resets the second hit check area set based on the vertex position after the vertices have been moved.

Each of the program and the information storage medium may cause the computer to function as the above contact event determination section and hit check area setting section.

This makes it possible to make a hit check reflecting the effect of the contact mark when another model object comes in contact with the second model object on which the contact mark remains, whereby realistic movement/motion simulation can be performed.

(13) According to one embodiment of the invention, there is provided an image generation system which generates an image of an object space viewed from a given viewpoint, the image generation system comprising:

a vertex shader section which, when a contact event in which a first model object comes in contact with a second model object in the object space has occurred, fetches height information of grid points corresponding to a contact plane of the first model object by referring to height map data in which height information of a surface of the first model object with respect to a given reference plane set for the first model object is set in a grid pattern, and moves vertices of a contact plane of the second model object based on the fetched height information of the grid points.

According to one embodiment of the invention, there is provided a program causing a computer to function as the above-described section.

According to one embodiment of the invention, there is provided a computer-readable information storage medium storing a program causing a computer to function as the above-described section.

According to these embodiments, an image which realistically represents the contact mark formed by the contact between the model objects can be generated by reflecting the shape (unevenness) of the contact plane of the first model object on the shape (unevenness) of the contact plane of the second model object.

(14) According to one embodiment of the invention, there is provided an image generation method comprising:

determining whether or not a contact event, in which a first model object comes in contact with a second model object in an object space, has occurred;

moving vertices of a contact plane of the second model object with the first model object when occurrence of the contact event has been determined;

setting a given reference plane for the first model object, and setting height information of a surface of the first model object with respect to the reference plane in a grid pattern by using height map data; and acquiring the height information of grid points corresponding to a contact plane of the first model object with the second model object by referring to the height map data, and moving the vertices of the contact plane of the second model object based on the fetched height information of the grid points.

(15) According to one embodiment of the invention, there is provided an image generation method comprising:

when a contact event in which a first model object comes in contact with a second model object in the object space has occurred, acquiring height information of grid points corresponding to a contact plane of the first model object by referring to height map data in which height information of a surface of the first model object with respect to a given reference plane set for the first model object is set in a grid pattern, and moving vertices of a contact plane of the second model object based on the fetched height information of the grid points.

These embodiments of the invention will be described below. Note that the embodiments describe below do not in any way limit the scope of the invention laid out in the claims herein. In addition, not all of the elements of the embodiments described below should be taken as essential requirements of the invention.

1. Configuration

FIG. 1 shows an example of a functional block diagram of an image generation system (game system) according to one embodiment of the invention. The image generation system according to this embodiment may have a configuration in which some of the elements (sections) shown in FIG. 1 are omitted.

An operation section 160 allows a player to input operational data of a player's object (player's character operated by the player). The function of the operation section 160 may be realized by a lever, button, steering wheel, microphone, touch panel type display, casing, or the like. A storage section 170 functions as a work area for a processing section 100, a communication section 196, and the like. The function of the storage section 170 may be realized by a RAM (VRAM) or the like.

An information storage medium 180 (computer-readable medium) stores a program, data, and the like. The function of the information storage medium 180 may be realized by an optical disk (CD or DVD), magneto-optical disk (MO), magnetic disk, hard disk, magnetic tape, or memory ROM). The processing section 100 performs various types of processing according to this embodiment based on a program (data) stored in the information storage medium 180. Specifically, a program for causing a computer to function as each section according to this embodiment (program for causing a computer to execute the processing of each section) is stored in the information storage medium 180.

A display section 190 outputs an image generated according to this embodiment. The function of the display section 190 may be realized by a CRT, LCD, touch panel type display, head mount display (HMD), or the like. A sound output section 192 outputs sound generated according to one embodiment of the invention. The function of the sound output section 192 may be realized by a speaker, headphone, or the like.

A portable information storage device 194 stores player's personal data, game save data, and the like. As the portable information storage device 194, a memory card, portable game device, and the like can be given. The communication section 196 performs various types of control for communicating with the outside (e.g. host device or another image generation system). The function of the communication section 196 way be realized by hardware such as a processor or communication ASIC, a program, or the like.

The program (data) for causing a computer to function as each section according to this embodiment may be distributed to the information storage medium 180 (storage section 170) from an information storage medium of a host device (server) through a network and the communication section 196. Use of the information storage medium of the host device (server) may also be included within the scope of the invention.

The processing section 100 (processor) performs processing such as game processing, image generation processing, or sound generation processing based on operational data from the operation section 160, a program, and the like. As the game processing, processing of starting a game when game start conditions have been satisfied, proceeding with a game, disposing an object such as a character or a map, displaying an object, calculating game results, finishing a game when game end conditions have been satisfied, and the like can be given. The processing section 100 performs various types of processing using a main storage section 171 of the storage section 170 as a work area. The function of the processing section 100 may be realized by hardware such as a processor (e.g. CPU or DSP) or ASIC (e.g. gate array) and a program.

The processing section 100 includes an object space setting section 111, a movement/motion processing section 112, a virtual camera control section 113, a contact event determination section 114, a hit check area setting section 115, a contact position determination section 116, a model data change section 117, an image generation section 120, and a sound generation section 130. The processing section 100 may have a configuration in which some of these sections are omitted.

The object space setting section 111 disposes various model objects (objects formed by a primitive surface such as a polygon, free-form surface, or subdivision surface) representing display objects such as a character, building, stadium, car, tree, pillar, wall, or map (topography) in an object space. Specifically, the object space setting section 111 determines the position and the rotational angle (synonymous with orientation or direction) of the model object in a world coordinate system, and disposes the model object at the determined position (X, Y, Z) and the determined rotational angle (rotational angles around X, Y, and Z axes).

The movement/motion pressing section 112 calculates the movement/motion (movement/motion simulation) of the model object (e.g. character, car, or airplane). Specifically, the movement/motion processing section 112 causes the model object to move in the object space or to make a motion (animation) based on the operational data input by the player using the operation section 160, a program (movement/motion algorithm), various types of data (motion data), and the like. In more detail, the movement/motion processing section 112 performs simulation processing by sequentially calculating movement information (position, rotational angle, speed, or acceleration) and motion information (position or rotational angle of each part object) of the model object in fire (1/60 sec) units. The frame is a time unit for performing the movement/motion processing (simulation processing) of the model object and the image generation processing.

The virtual camera control section 113 controls a virtual camera (viewpoint) for generating an image viewed from a given (arbitrary) viewpoint in the object space. In more detail, the virtual camera control section 113 controls the position (X, Y, Z) or the rotational angle (rotational angles around X, Y, and Z axes) of the virtual camera (controls the viewpoint position or the line-of-sight direction).

For example, when imaging the model object (e.g. character, ball, or car) from behind using the virtual camera, the virtual camera control section 113 controls the position or the rotational angle (orientation) of the virtual camera so that the virtual camera follows a change in the position or the rotation of the model object. In this case, the virtual camera control section 113 may control the virtual camera based on information such as the position, rotational angle, or speed of the model object obtained by the movement/motion processing section 112. Or, the virtual camera control section 113 may rotate the virtual camera at a predetermined rotational angle or move the virtual camera along a predetermined path. In this case, the virtual camera control section 113 controls the virtual camera based on virtual camera data for specifying the position (path) or the rotational angle of the virtual camera. When two or more virtual cameras (viewpoints) exist, the above-described control is performed for each via camera.

The contact event determination section 114 determines whether or not a contact event, in which a first model object and a second model object come in contact in the object space, has occurred. In more detail, the contact event determination section 114 makes a hit check (hit determination processing) based on the positional relationship between a first hit check area set for the first model object and a second hit check area set for the second model object, and determines that the contact event has occurred when the first hit check area and the second hit check area have a positional relationship in which the first hit check area overlaps the second hit check area.

The contact event may be caused to occur according to a program when given conditions have been satisfied, or may be caused to occur based on the player's intention by allowing the player to move the character model object by operating the character, for example.

When the vertices of the contact plane of the second model object with the first model object have been moved by a vertex shader section 124 described later, the hit check area setting section 115 resets (updates) the second hit check area set for the second model object based on the vertex position after the vertices have been moved. This makes it possible to make a hit check reflecting the effect of the contact mark when another model object comes in contact with the second model object on which the contact mark remains, whereby realistic movement/motion simulation can be performed.

The contact position determination section 116 determines the distance range (first distance range, second distance range, or third distance range) of the contact position of the first model object and the second model object with respect to the virtual camera (viewpoint) when the contact event determination section 114 has determined that the contact event has occurred.

The model data change section 117 changes second model object model data fetched by the vertex shader section 124 corresponding to the distance between the viewpoint and the contact position of the model objects when two or more pieces of second model object model data which differ in level of detail. In more detail, two or more pieces of data which differ in level of detail (definition) are provided in advance as the model data which defines the second model object. Each piece of model data is stored in a model data storage section 177. The model data change section 117 changes (switches) the model data which defines the second model object corresponding to the distance (positional relationship) between the contact position of the model objects and the viewpoint. Specifically, the model data-change section 117 causes the vertex shader section 124 to fetch the second model object model data with higher level of detail as the distance between the viewpoint and the contact position becomes shorter.

The model data change section 117 may cause the vertex shader section 124 to fetch the second model object model data with high level of detail (higher than that of original model data) instead of the second model object model dam with low level of detail (original model data) only when the contact position of the model objects is in the first distance range from the viewpoint. For example, if the first distance range is set in a range closer to the viewpoint, since it suffices to change the second model object model data to data with high level of detail only when the contact event has occurred at a position close to the viewpoint for which detailed representation is necessary, the calculation load can be reduced, and the memory can be efficiently used.

The image generation section 120 performs drawing processing based on the results of various types of processing (game processing) performed by the processing section 100 to generate an image, and outputs the generated image to the display section 190. When generating a three-dimensional game image, a vertex list is input, and vertex processing is performed based on the input vertex list. It is also possible to perform vertex generation processing (tessellation, curved surface division, or polygon division) for dividing a polygon, if necessary, before performing the vertex processing. In the vertex processing, vertex movement processing and geometric processing such as coordinate transformation (world coordinate transformation or camera coordinate transformation), clipping, or perspective transformation are performed, and vertex data (e.g. vertex position coordinates, texture coordinates, color data, normal vector, or alpha value) of the vertices of the model object is created based on the processing results. Then, pixel processing of drawing pixels forming a display image (fragments forming display screen) is performed based on the vertex data. In the pixel processing, the final pixel drawing color is determined by performing various types of processing such as texture reading, shading, translucent blending, and anti-aliasing, and the drawing color of the model object subjected to perspective transformation is output to (drawn in) a frame buffer 173 (buffer which can store image information in pixel units; VRAM). This allows generation of an image (frame image) viewed from the virtual camera (given viewpoint) in the object space. When two or more virtual cameras (viewpoints) exist, the frame image is generated so that images viewed from the virtual cameras can be displayed on one screen as divided images.

The image generation section 120 includes a vertex generation section 122, the vertex shader section 124, and a pixel shader section 126. The image generation section 120 may have a configuration in which some of these sections are omitted.

The vertex generation section 122 generates new vertices (tessellation, curved surface division, or polygon division) to increase the number of vertices of the second model object when the contact event determination section 114 has determined that the contact event has occurred. In more detail, the vertex generation section 122 increases the number of vertices of the second model object by generating new vertices between the vertices of the second model object.

In this case, the vertex generation section 122 may generate new vertices only on the contact plane of the second model object. This allows the level of detail of the second model object to be locally increased.

The vertex generation section 122 may generate new vertices of the second model object only when the contact position of the first and second model objects is in the first distance range from the viewpoint. This allows a detailed contact mark to be represented by generating new vertices only when the contact position of the model objects is in a specific distance range from the viewpoint.

The vertex shader section 124 moves the vertices of the contact plane of the second model object (e.g. topography or building) which comes in contact with the first model object (e.g. character, ball, or car) according to a vertex shader program when the contact event determination section 114 has determined that the contact event has occurred. In more detail, a reference plane is set for the first model object, height information of the surface of the first model object with respect to the reference plane is set in a grid (texel) pattern using a height map texture (height map data in a broad sense), and the height map texture is stored in a texture storage section 175. The height map texture may be set using a grayscale image, or may be set using a single color component image (R component image, G component image, or B component image). In the height map texture, the sine component or the cosine component of the normal vector or various types of image information such as the alpha value may be set (defined) as the height information. The height information may not represent the shape of the primitive surface formed by the vertices of the first model object, but may be virtually set as the surface shape of the first model object. For example, a tire of a car is represented by mapping a texture image representing a tire tread on a columnar (or polygonal prism-shaped) model object which is not provided with a tire tread. The height information representing the actual tread pattern can be separately defined (set) by the height map texture.

The vertex shader section 124 fetches the texel values representing the height information set for the texels (grid points) corresponding to the vertices of the contact plane of the first model object with the second model object by referring to the height map texture and moves the vertices of the contact plane of the second model object based on the fetched texel values (grid point height information).

When new vertices of the second model object have been generated by the vertex generation section 122, the vertex shader section 124 moves the vertices of the contact plane of the second model object including the new vertices so that the contact plane of the second model object is depressed corresponding to the contact plane of the first model object. This enables detailed representation of the contact mark.

The vertex shader section 124 moves the vertices including the new vertices generated by the vertex generation section 122 when the contact position of the model objects is in the first distance range from the viewpoint. On the other hand, when the contact position of the model objects is in the second distance range farther than the first distance range from the viewpoint, the vertex shader section 124 performs normal mapping (bump mapping) in which the inverse vector of the normal vector of each of the vertices of the contact plane of the first model object is set as the normal vector of each of the vertices of the contact plane of the second model object. The calculation load can be reduced and the processing speed can be increased by moving the vertices only when the contact event has occurred in a distance range close to the viewpoint for which detailed representation is necessary.

The vertex shader section 124 may change two or more height map textures (height map data in a broad sense) which differ in at least one of the pieces of height information set for the grid point and the range of the contact plane corresponding to the movement information of the first model object, the material information set for the second model object, or a load applied to the second model object by the first model object, and may move the vertices of the contact plane of the second model object using an appropriate height map texture.

The pixel shader section 126 maps a texture (texel values) stored in the texture storage section 175 on the model object. In more detail, the pixel shader section 126 reads a texture (surface properties such as color and alpha value) from the texture storage section 175 using the texture coordinates set (assigned) to the vertices of the model object or the like. The pixel shader section 126 maps the texture (two-dimensional image or pattern) on the model object. In this case, the pixel shader section 126 associates the pixels with the texels, and performs bilinear interpolation (texel interpolation) or the like.

In this embodiment, when the contact position determination section 116 has determined that the contact position of the model objects is in the third distance range farther than the first and second distance ranges from the virtual camera, the pixel shader section 126 maps a mark representation image (mark representation texture) read from the texture storage section 175 on the contact plane of the second model object on which the mark remains.

The above-described vertex shader section 124 or pixel shader section 126 is one type of hardware (programmable shader) which allows polygon drawing processing to be programmable according to a shader program created using shading language. The probable shader allows the above-described vertex processing or pixel processing to be programmable to increase the degrees of freedom of polygon drawing processing, thereby significantly improving the representation capability in comparison with fixed processing of known hardware.

The sound generation section 130 performs sound processing based on the results of various types of processing performed by the processing section 100 to generate game sound such as background music (BGM), effect sound, or voice, and outputs the game sound to the sound output section 192.

The image generation system according to this embodiment may be a system dedicated to a single-player mode in which only one player can play a game, or may be a system provided with a multi-player mode in which two or more players can play a game. When two or more players play a game, game images and game sound provided to the players may be generated using one terminal, or may be generated by distributed processing using two or more terminals (game devices or portable telephones) connected through a network (transmission line or communication line), for example.

2. Method According to this Embodiment 2.1 Method of Representing Contact Mark Using Height Map In this embodiment, a contact mark which occurs when the first model object comes in contact with the second model object is represented using a height map image (synonymous with height map texture; height map data in a broad sense) in which height information is set for the texels (grid points).

Figure 2:
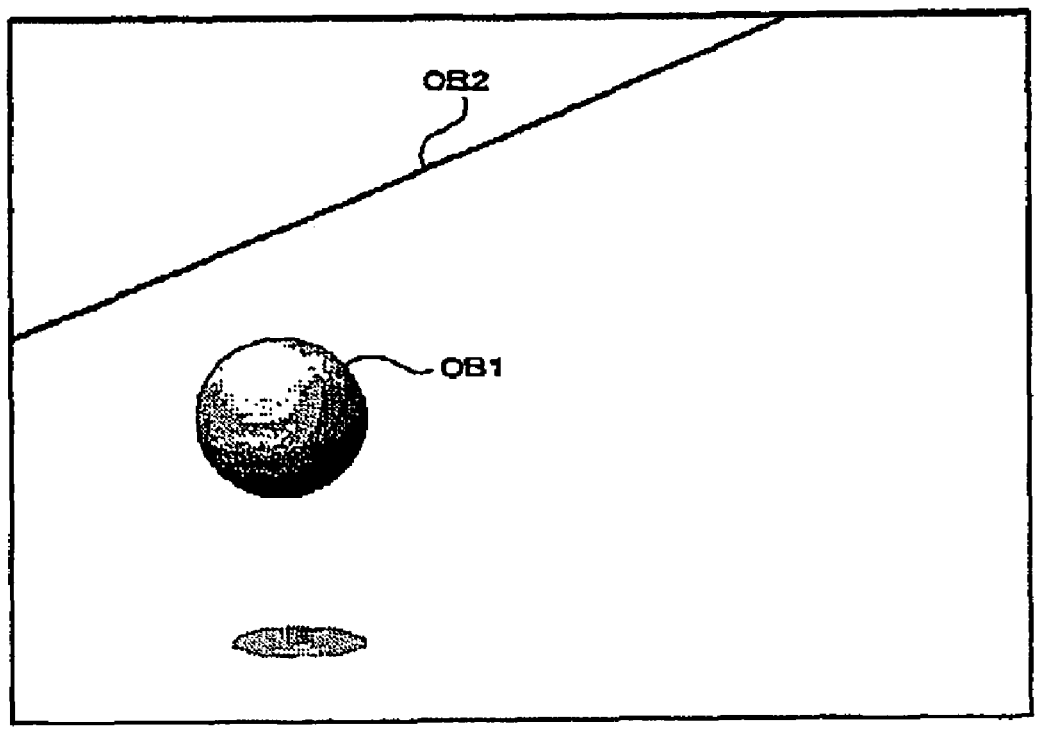
FIG. 2 is a diagram illustrative of an image drawn by a method according to one embodiment of the invention.
Figure 2:
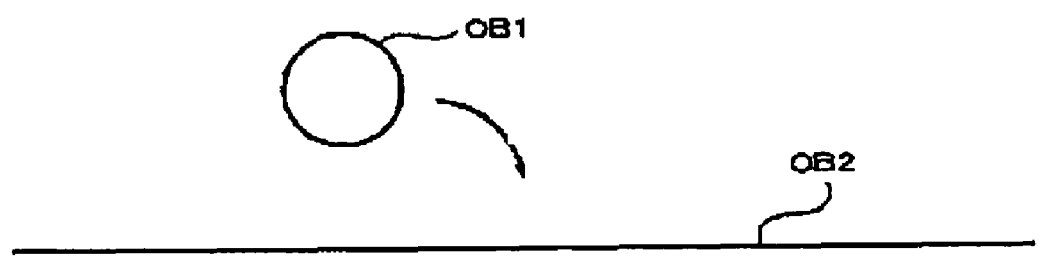
Figure 3:
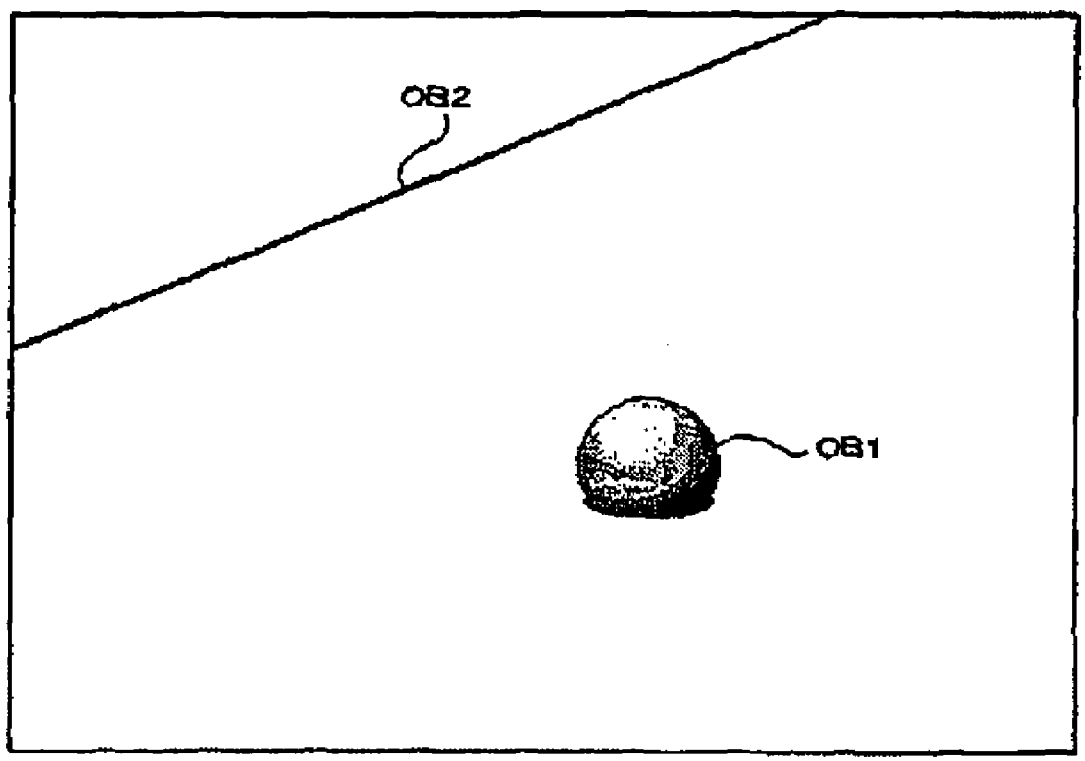
FIG. 3 is a diagram illustrative of an image drawn by a method according to one embodiment of the invention.
Figure 3:
Figure 4:
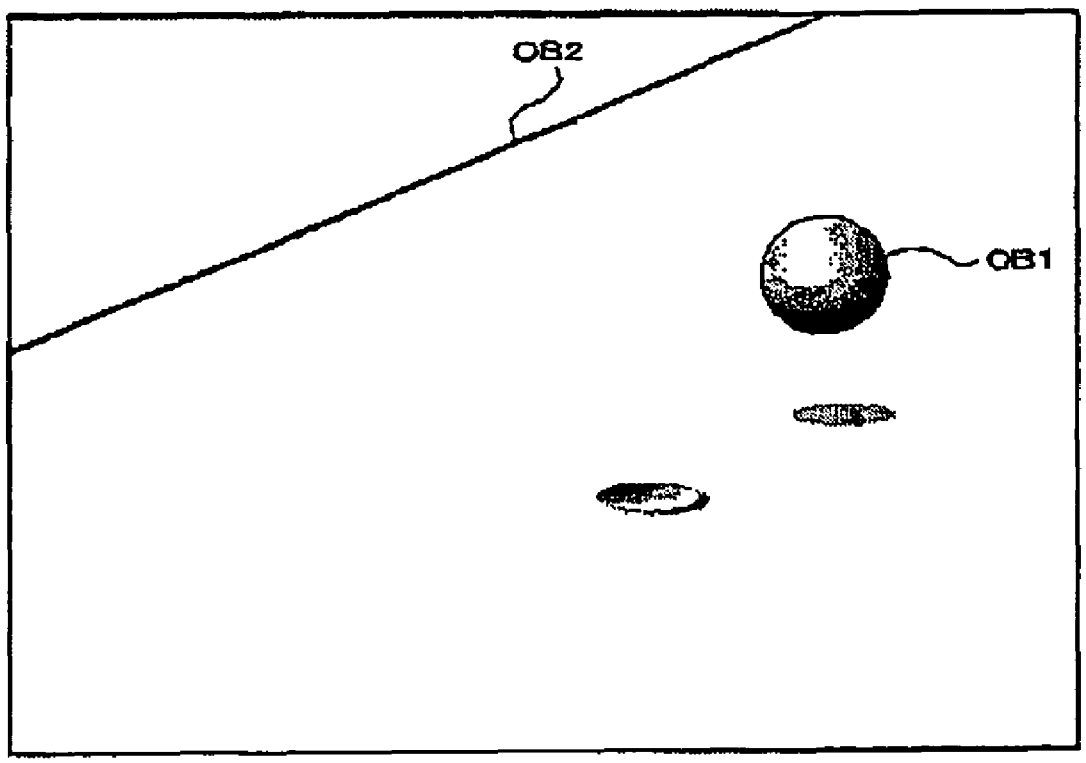
FIG. 4 is a diagram illustrative of an image drawn by a method according to one embodiment of the invention.
Figure 4:

As a specific example, consider the case where a spherical object OB1 (first model object) collides with a topographical object OB2 (second model object) and then jumps up and down, as shown in FIGS. 2 to 4. In this case, a mark corresponding to the shape of the spherical object OB1 which has come in contact with the topographical object OB2 remains on the topographical object OB2, as shown in FIG. 4.

Figure 5A:
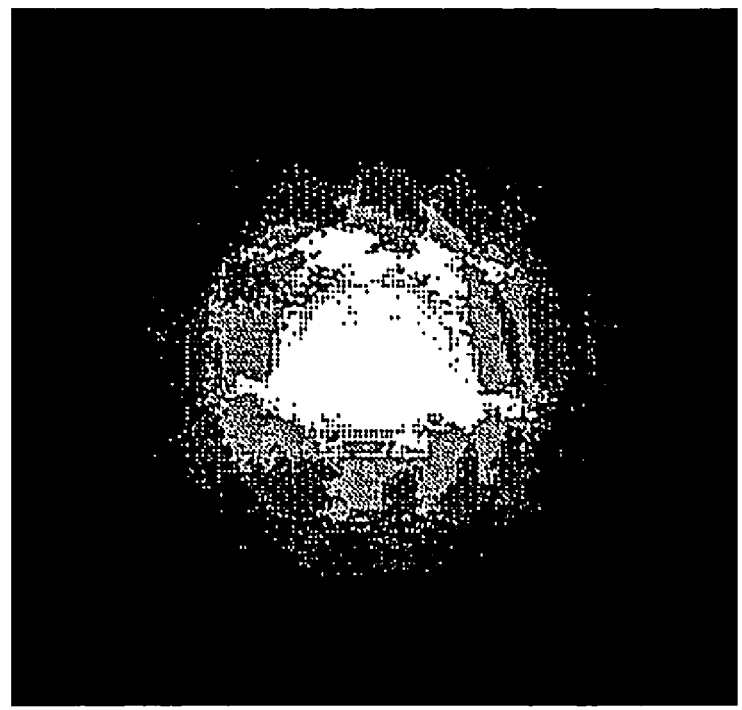
FIGS. 5A and 5B are diagrams illustrative of a height map.
Figure 5B:
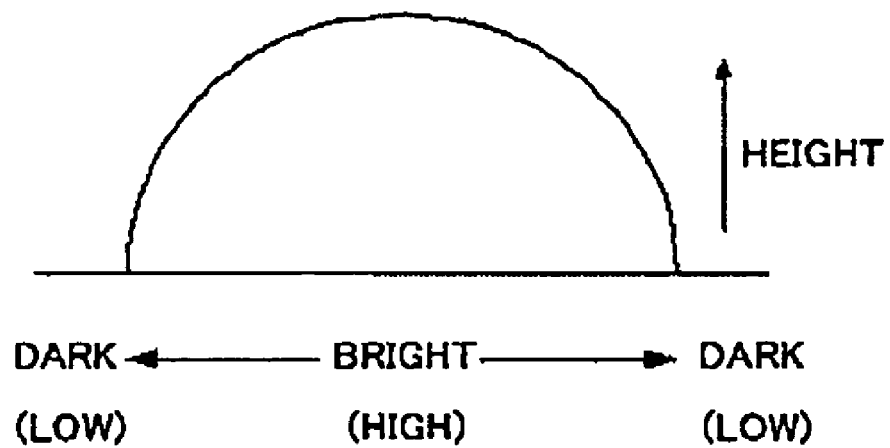
Figure 6A:
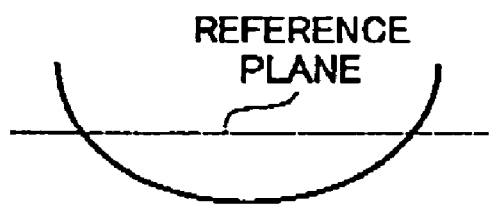
FIGS. 6A and 6B are diagrams illustrative of a height map.
Figure 6B:

In this embodiment, as shown in FIG. 5A, the mark is represented by moving the vertices of the contact plane (collision plane) of the topographical object OB2 with the spherical object OB1 using the height map image in which the luminance of the texel of a grayscale image is set as the height information from the reference plane set for the spherical object OB1. In the height map image shown in FIG. 5A, the height information is set so that the brighter the texel (the higher the luminance), the greater the height from the reference plane. The reference plane for setting the height information may be a flat surface or a curved surface. For example, when setting a flat reference plane as shown in FIG. 6A, the height information corresponding to the shape of the object can be set. On the other hand, when setting a curved reference plane as shown in FIG. 6B, height information which can more precisely reflect the unevenness on the surface of the object can be set.

Figure 7A:
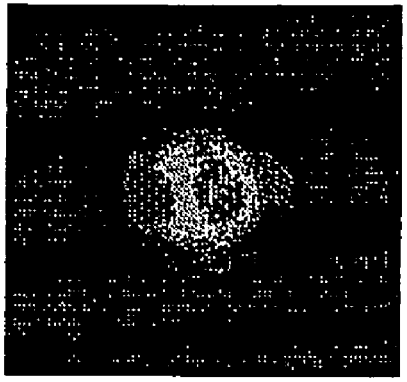
FIGS. 7A and 7B are diagrams illustrative of a height map.
Figure 7A:
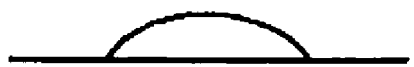
Figure 7B:
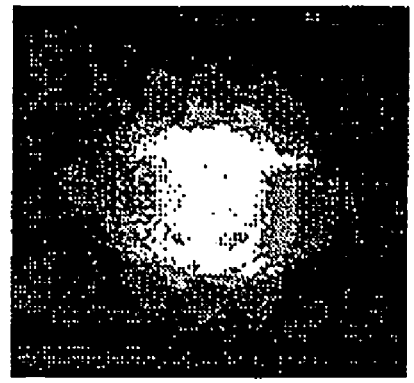
Figure 7B:

It is preferable to provide two or more height map images corresponding to material information of the topographical object OB2, the movement information of the spherical object OB1, and the like, and to change the height map image depending on the situation. FIG. 7A shows a height map image suitable for the case where the topographical object OB2 is made of a hard material or the moving velocity of the spherical object OB1 is low, for example. Specifically, the amount of deformation of the topographical object OB2 should be reduced when the topographical object OB2 is made of a hard material or the moving velocity of the spherical object OB1 is low. In FIG. 7A, the range of the mark of the topographical object OB2 is reduced, and the height information is distributed so that the depth of the mark is reduced. FIG. 7B shows a height map image suitable for the case where the topographical object OB2 is made of a soft material or the moving velocity of the spherical object OB1 is high, for example. Specifically, the amount of deformation of the topographical object OB2 should be increased when the topographical object OB2 is made of a soft material or the moving velocity of the spherical object OB1 is high. In FIG. 7B, the range of the mark of the topographical object OB2 is increased, and the height information is distributed so that the depth of the mark is increased. As another example, when representing tire tread marks, a height map image may be used in which the height information differs between the inner wheel and the outer wheel when a car turns. Since a high load is applied to the inner wheel when a car turns, it is preferable to set the height information so that the topography is deformed to a greater extent in the height map image for representing the tire tread marks of the inner wheel than in the height map image for representing the tire tread marks of the outer wheel.

In this embodiment, a mark can be realistically represented by moving the vertices of the contact plane of the topographical object OB2 so that the contact plane becomes depressed based on the height information set for the texels of the height map image.

Figure 8A:
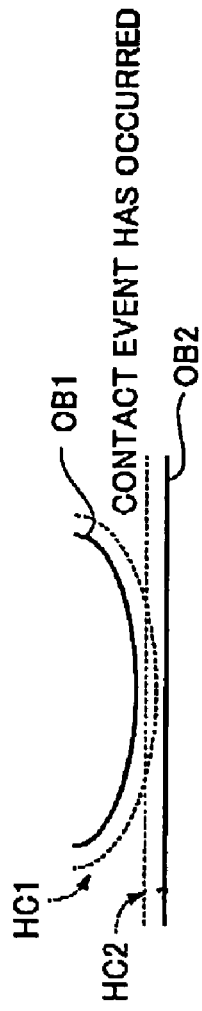
FIGS. 8A to 8C are diagrams illustrative of a method according to one embodiment of the invention.
Figure 8B:
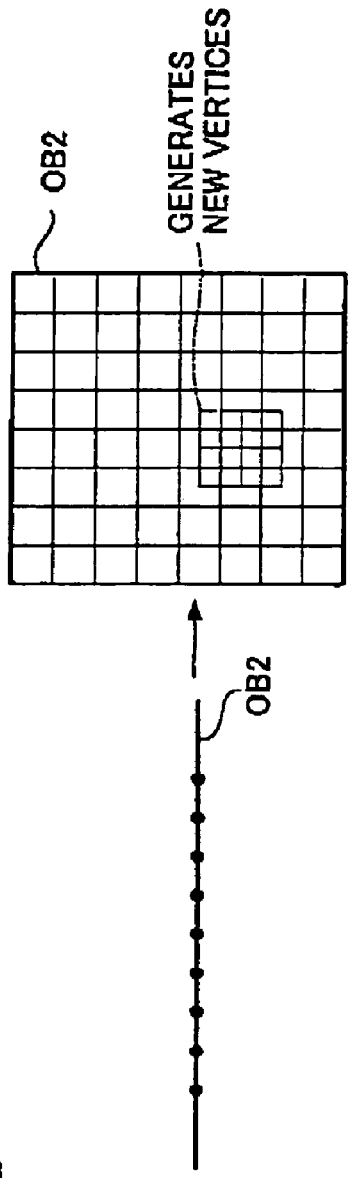
Figure 8C:
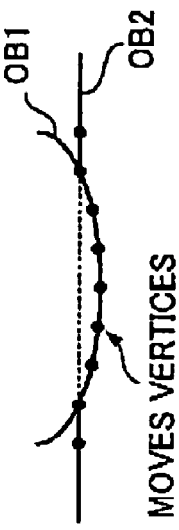

In more detail, as shown in FIG. 8A, when a hit check area HC1 of the spherical object OB1 (first hit check area) has overlapped a hit check area HC2 of the topographical object OB2 (second hit check area) so that the contact event (collision event) has occurred, the height map image is read corresponding to the movement information of the spherical object OB1 and the material information of the topographical object OB2 when contact has occurred. In this case, when the number of vertices of the topographical object OB2 is insufficient, new vertices are generated between the vertices to divide the polygon, as shown in FIG. 8B. The moving amount of the vertex is calculated from the height information fetched by referring to the height map image, and the calculated moving amount is subtracted from (or, added to) the vertex coordinates (vertex position) of the contact plane of the topographical object OB2 to determine the vertex coordinates after movement. As shown in FIG. 8C, each of the vertices of the contact plane of the topographical object OB2 including the additionally generated vertices is moved to the position at the determined vertex coordinates. As a result, the contact mark with the spherical object OB1 as shown in FIG. 4 can be represented on the topographical object OB2.

Figure 9:
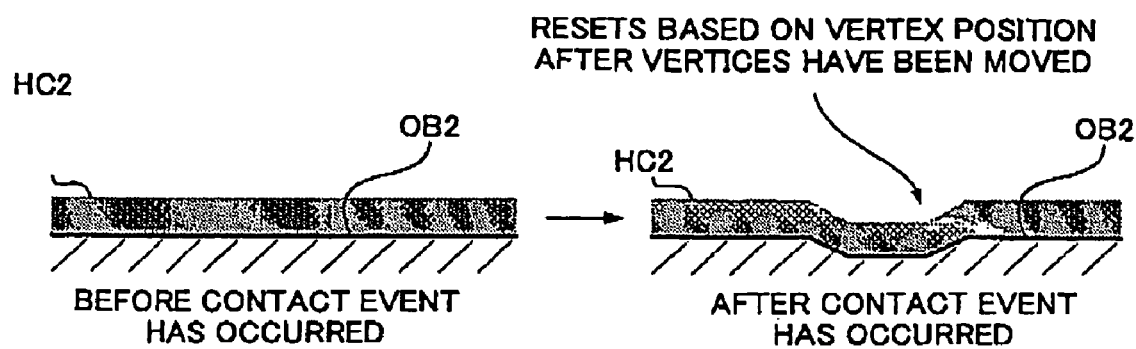
FIG. 9 is a diagram illustrative of a method according to one embodiment of the invention.

When moving the vertices of the contact plane of the topographical object OB2, it is preferable to make a hit check corresponding to the deformed model. In this embodiment, the hit check area of the topographical object OB2 is reset after the contact event has occupied, as shown in FIG. 9. In more detail, the hit check area is reset based on the position (vertex coordinates) of each vertex after moving the vertex. This makes it possible to perform realistic movement/motion simulation when another model object comes in contact with the topographical object OB2 on which the mark remains.

Figure 10A:
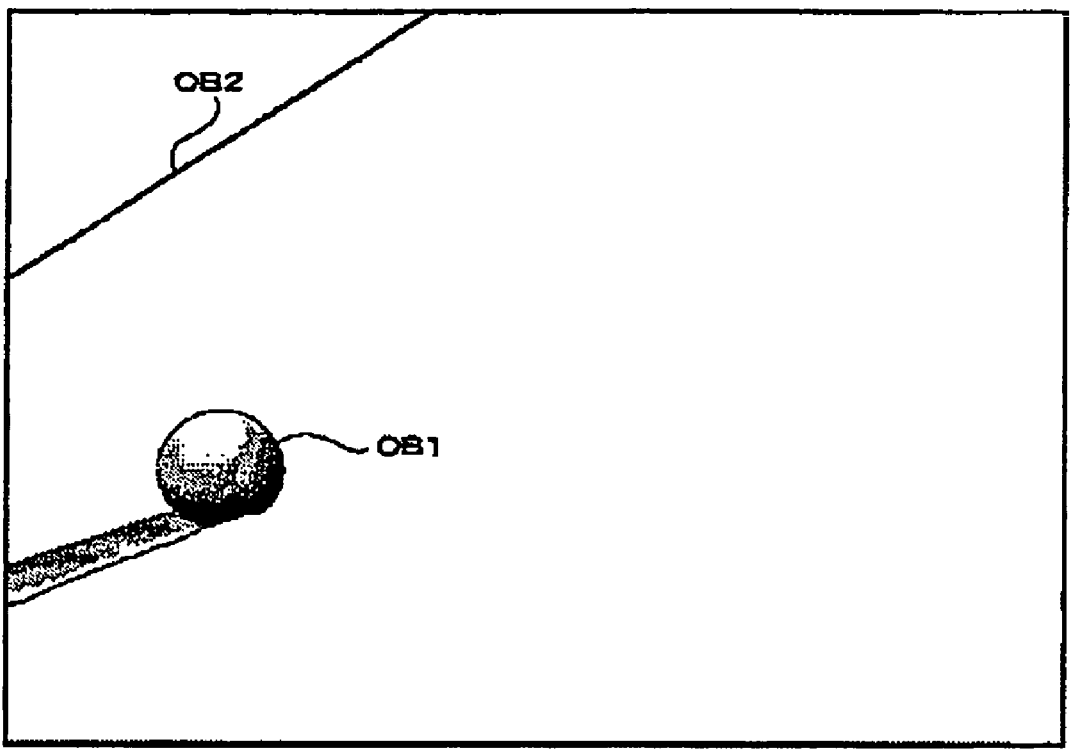
FIGS. 10A and 10B are diagrams illustrative of images drawn by a method according to one embodiment of the invention.
Figure 10B:
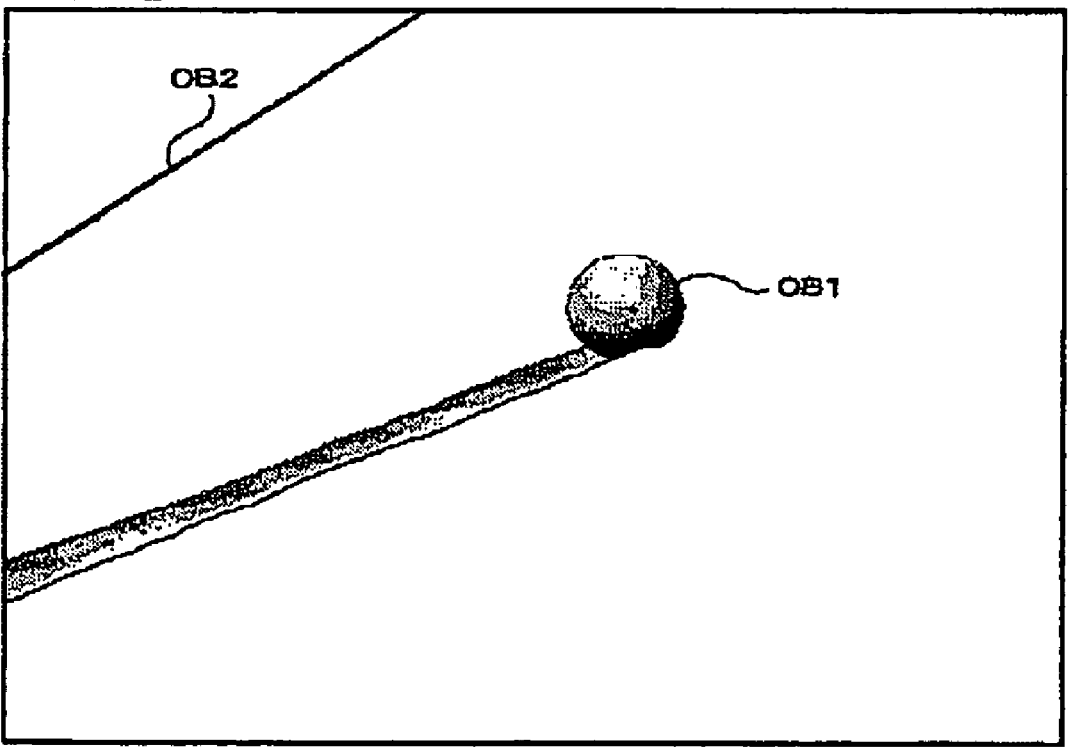

The method of representing a contact mark according to this embodiment may be applied not only to the case where the model objects positioned at a distance approach and come in contact with each other, but also to the case where the contact area increases in a state in which the model objects are in contact with each other. For example, when the spherical object OB1 (first model object) rolls over a snow surface object OB2 (second model object) as shown in FIGS. 10A and 10B, the method according to this embodiment may be applied to the case of representing a mark remaining on the snow surface object OB2 due to the spherical object OB1. This also applies to representation of tire tread marks and the like.

2.2 Method of Representing Contact Mark Corresponding to Distance from Virtual Camera In this embodiment, the processing of representing a contact mark is switched corresponding to the distance (positional relationship) between the contact position of the model objects and the virtual camera (viewpoint).

Figure 11:
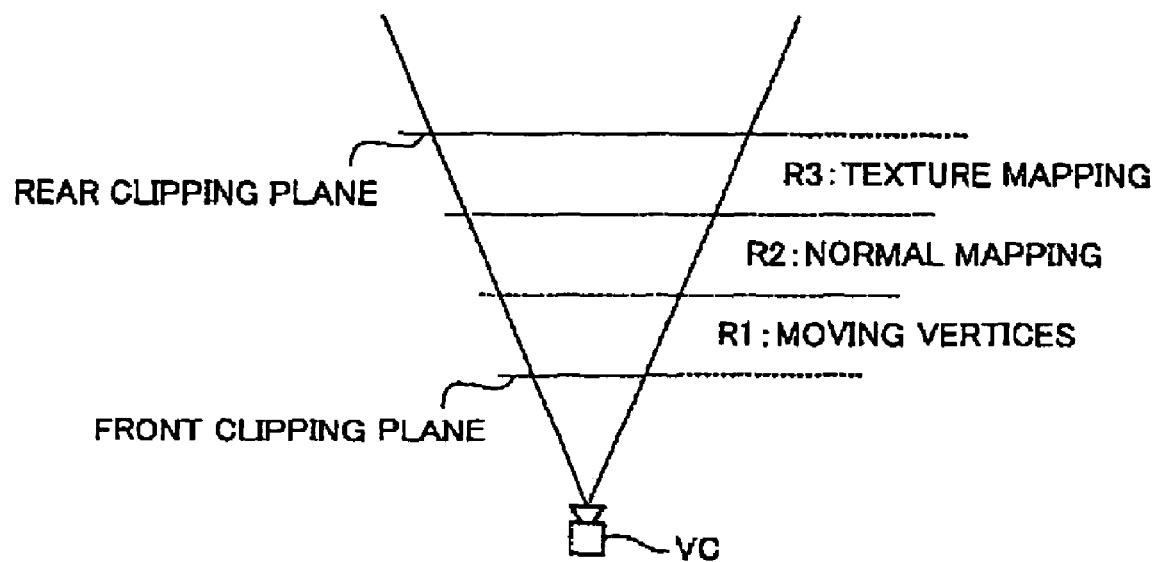
FIG. 11 is a diagram illustrative of a method according to one embodiment of the invention.

In more detail, as shown in FIG. 11, first to third distance ranges R1 to R3 are set in advance by dividing the space between a front clipping plane and a rear clipping plane used when generating an image viewed from the virtual camera VC in the depth direction.

Figure 12A:
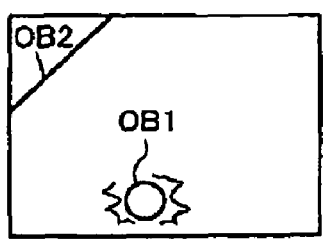
FIG. 12A to FIG. 12C are diagrams illustrative of a method according to one embodiment of the invention.
Figure 12A:
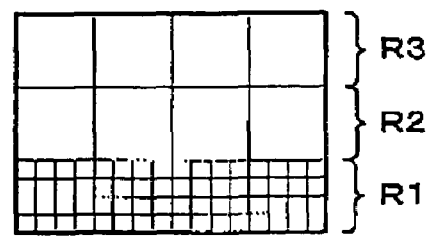

In the first distance range R1, it is desirable to represent a contact mark in detail since the distance from the virtual camera VC is short Therefore, when the contact event has occurred in the first distance range R1 as shown in FIG. 12A, the contact mark is represented by moving the vertices of the contact plane of the topographical object OB2 (second model object) with the spherical object OB1 (first model object) using the height map image. In this case, new vertices are generated in order to increase the number of vertices in the first distance range R1, or the model data is switched (changed) to model data with high level of detail (definition), and the vertices of the contact plane of the topographical object OB2 are moved.

Figure 12B:
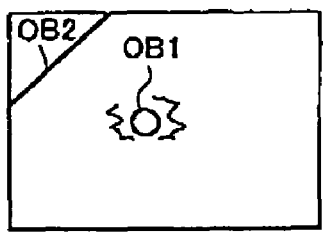
Figure 12B:
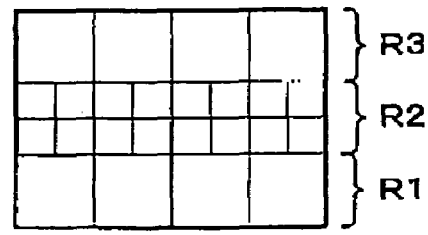
Figure 13:
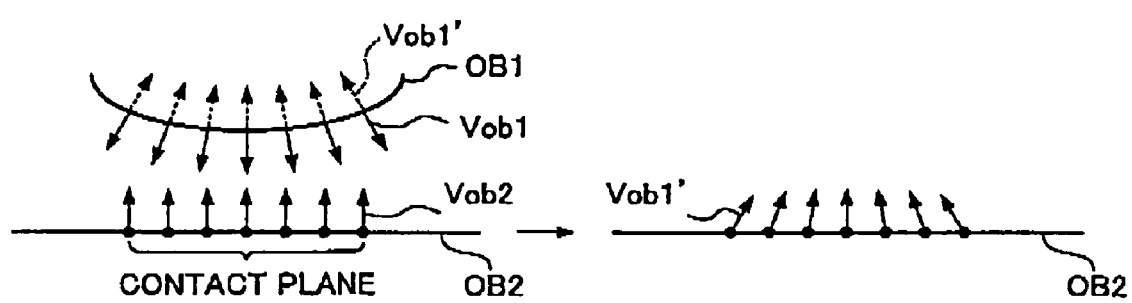
FIG. 13 is a diagram illustrative of a method according to one embodiment of the invention.

In the second distance range R2, since the distance from the virtual camera VC is not too short, a condition unnatural to the human eye does not occur even if a contact mark is not represented in detail in comparison with the first distance range R1. Therefore, when the contact event has occurred in the second distance range R2 as shown in FIG. 12B, the mark remaining on the topographical object OB2 is represented by normal mapping (bump mapping). In this case, since the level of detail (definition) of the topographical object OB2 need not be increased in comparison with the first distance range R1, new vertices are generated so that the number of vertices is smaller than that in the first distance range R1, or the model data is switched to model data with level of detail lower than that of the model data used for the first distance range R1, and normal mapping using normal vector information of the spherical object OB1 is performed for the contact plane of the topographical object OB2. In more detail, as shown in FIG. 13, a normal map including a texture of inverse vectors Vob1' of normal vectors Vob1 of the contact plane of the spherical object OB1 corresponding to the contact plane of the topographical object OB2 is provided, and the inverse vectors Vob1' are set as the normal vectors of the vertices of the contact plane of the topographical object OB2, whereby the contact mark can be represented so that the contact mark is depressed by utilizing shade based on the luminance calculated based on the vectors Vob1'.

Figure 12C:
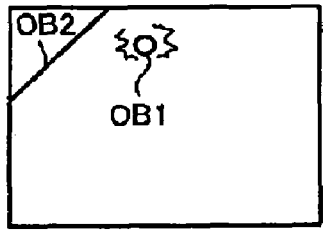
Figure 12C:
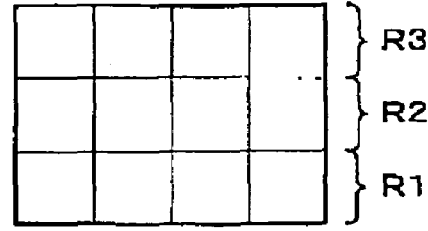

In the third distance range R3, since the distance from the virtual camera VC is sufficiently long, the roughness of the image does not pose a problem even if a contact mark is not realistically represented. Therefore, when the contact event has occurred in the third distance range R3 as shown in FIG. 12C, a mark representation image provided in advance is mapped on the contact plane of the topographical object OB2 by a known texture mapping method. This does not cause the viewer to sec deterioration of the image quality since the distance from the virtual camera VC is sufficiently long.

As described above the method according to this embodiment allows a reduction in calculation load or an increase in processing speed without causing the viewer to see deterioration of the image quality by selectively using (switching) the method of representing a contact mark in detail by moving the vertices corresponding to the positional relationship between the contact position of the model objects and the virtual camera and the method of simply representing a contact mark by normal mapping or known texture mapping.

3. Processing According to this Embodiment

A detailed processing example according to this embodiment is described below using flowcharts shown in FIGS. 14 and 15.

Figure 14:
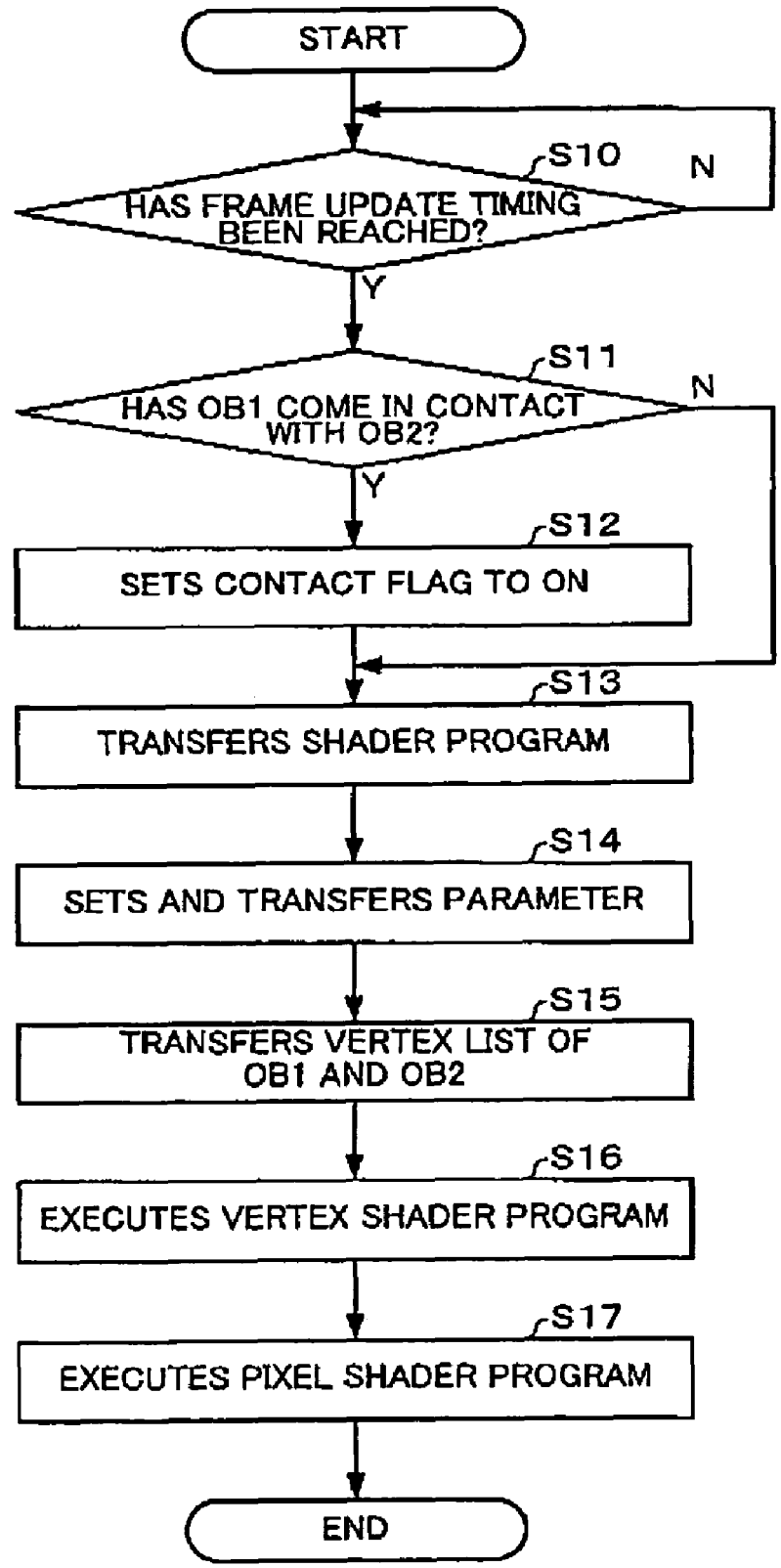
FIG. 14 is a flowchart of detailed processing according to one embodiment of the invention.

As shown in FIG. 14, whether or not the frame update (1/60 sec) timing has been reached is determined (step S10). When the frame update timing has been reached ("Y" in step S10), whether or not the first model object OB1 has come in contact with the second model object OB2 is determined (step S11). In more detail, whether or not the first hit check area HC1 set for the first model object OB1 has overlapped the second hit check area HC2 set for the second model object OB2 is determined, as described with reference to FIG. 8A. When it is determined that the model objects have come in contact with each other ("Y" in step S11), a contact flag is set to ON (step S12). When it is determined that the model objects have not come in contact with each other, the processing transitions to the step S13 without performing the step S12.

Then, shader programs for the vertex shader and the pixel shader are transferred, and various parameters necessary for drawing an image by executing the shader programs are set and transferred (steps S13 and S14). Then, the vertex list of each of the model objects OB1 and OB2 is transferred to the vertex shader (step S15), and the vertex shader program transferred in the step S13 is executed (step S16).

Figure 15:
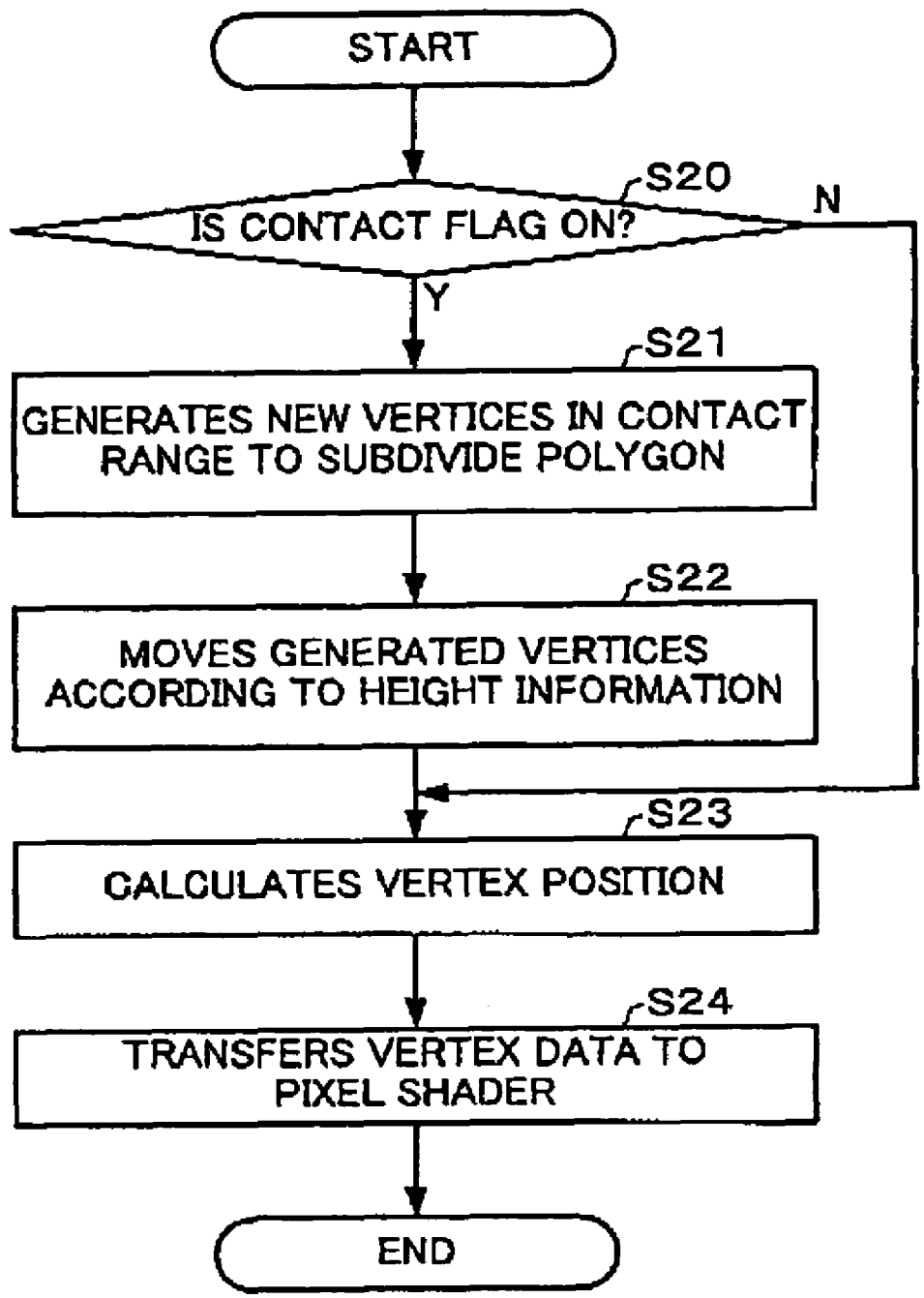
FIG. 15 is a flowchart of detailed processing according to one embodiment of the invention.

The vertex shader performs the vertex processing according to a flowchart shown in FIG. 15. Few, the vertex shader checks the contact flag (step S20). When the contact flag is ON ("Y" in step S20), the vertex shader generates new vertices in the contact range, as described with reference to FIG. 8B, to increase the number of vertices of the contact plane of the second model object, thereby subdividing the polygon (step S21). Then, the vertex shader moves the vertices of the contact plane including the generated vertices according to the height information (texel value) obtained by referring to the height map image, as described with reference to FIG. 8C (step S22). Then, the vertex shader calculates the screen coordinates of the vertices of each model object by transforming the vertex coordinates using geometry processing such as perspective transformation (step S23). In this case, the vertex shader also sets the texture coordinates of the texture mapped on the model object. The vertex shader transfers the created vertex data to the pixel shader to finish the vertex shader program.

Again referring to the flowchart shown in FIG. 14, when the execution of the vertex shader program has been completed, the pixel shader program is executed based on the vertex data transferred from the vertex shader. The pixel shader determines the color of the pixels of the display image by texture mapping or the like, and outputs the color data to the frame buffer to draw the model object (step S17).

4. Hardware Configuration

Figure 16:
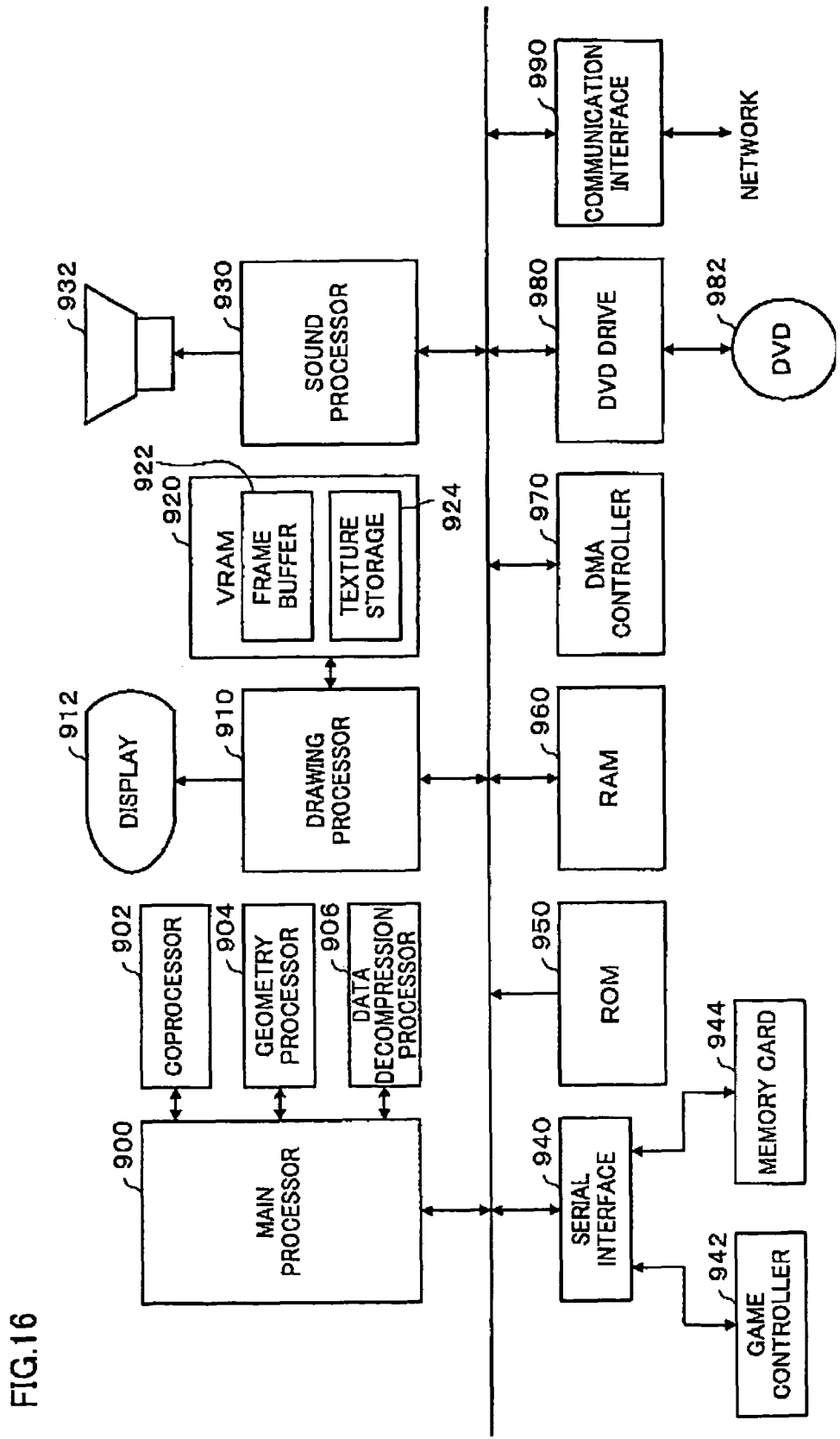
FIG. 16 is a hardware configuration example.

FIG. 16 shows a hardware configuration example which can implement this embodiment. A main processor 900 operates based on a program stored in a DVD 982 (information storage medium; may be CD), a program downloaded through a communication interface 990, a program stored in a ROM 950, or the like, and performs game processing, image processing, sound processing, and the like. A coprocessor 902 assists the processing of the main processor 900, and performs matrix calculation (vector calculation) at high speed. When a matrix calculation is necessary for physical simulation to cause an object to move or make a motion, a program which operates on the main processor 900 directs (requests) the coprocessor 902 to perform the processing.

A geometry processor 904 performs geometric processing such as a coordinate transformation, perspective transformation, light source calculation, or curved surface generation based on instructions from a program operating on the main processor 900, and performs a matrix calculation at high speed. A data decompression processor 906 decodes compressed image data or sound data, or accelerates the decode processing of the main processor 900. This enables a motion picture compressed according to the MPEG standard or the like to be displayed in a start screen or a game screen.

A drawing processor 910 draws (renders) an object formed by a primitive surface such as a polygon or a curved surface. When drawing an object, the main processor 900 delivers drawing data to the drawing processor 910 by utilizing a DMA controller 970, and transfers a texture to a texture storage section 924, if necessary. The drawing processor 910 draws an object in a frame buffer 922 based on the drawing data and the texture while performing hidden surface removal utilizing a Z buffer or the like. The drawing processor 910 also performs alpha blending (translucent processing), depth queuing, MIP mapping, fog processing, bilinear filtering, trilinear filtering, anti-aliasing, shading, and the like. When a programmable shader such as a vertex shader or a pixel shader is mounted, the programmable shader creates or changes (updates) vertex data or determines the color of a pixel (or fragment) according to a shader programs. When the image of one frame has been written into the frame buffer 922, the image is displayed on a display 912.

A sound processor 930 includes a multi-channel ADPCM sound source or the like, generates game sound such as background music (BGM), effect sound, or voice, and outputs the generated game sound through a speaker 932. Data from a game controller 942 or a memory card 944 is input through a serial interface 940.

A system program or the like is stored in the ROM 950. In an arcade game system, the ROM 950 functions as an information storage medium, and various programs are stored in the ROM 950. A hard disk may be used instead of the ROM 950. A RAM 960 functions as a work area for various processors. The DMA controller 970 controls DMA transfer between the processor and the memory. A DVD drive 980 (may be CD drive) accesses the DVD 982 (may be CD) in which a program, image dam, sound data, and the like are stored. The communication interface 990 transfers data to and from the outside through a network (communication line or high-speed serial bus).

The processing of each section (each means) according to this embodiment may be realized by only hardware, or may be realized by a program stored in the information storage medium or a program distributed through the communication interface. Or, the processing of each section may be realized by hardware and a program.

When realizing the processing of each section according to this embodiment by hardware and a program, a program for causing the hardware (computer) to function as each section according to this embodiment is stored in the information storage medium. In more detail the program directs each of the processors 902, 904, 906, 910, and 930 (hardware) to perform the processing, and transfers data to the processors, if necessary. The processor 902, 904, 906, 910, and 930 realize the processing of each section according to this embodiment based on the instructions and the transferred data.

The invention is not limited to the above-described embodiments, and various modifications can be made within the scope of the invention. Any term (such as a virtual camera, distance, pixels, normal mapping, a height map image or height map texture, and definition) cited with a different term having broader or the same meaning (such as a viewpoint, positional relationship, fragments, bump mapping, height map data, and degree of detail) at least once in this specification or drawings can be replaced by the different term in any place in this specification and drawings. The method of representing a contact mark is not limited to the method described in the above-described embodiment, and a method equivalent to the above-described method is also included within the scope of the invention.

The above-described embodiment illustrates the case where the model object representing a sphere comes in contact with the model object representing topography. Note that the invention is not limited thereto. The invention may be applied to representation of a footprint, tire tread mark, or bullet mark. When two or more virtual cameras exist in the object space, the model object may be deformed after the contact by different types of processing in units of virtual cameras, if necessary.

The invention may be applied to various games (e.g. fighting game, shooting game, robot fighting game, sport game, competitive game, role playing game, music playing game, and dance game). The invention may be applied to various image generation systems such as an arcade game system, consumer game system, large-scale attraction system in which a number of players participate, simulator, multimedia terminal, system board which generates a game image, and portable telephone.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A computer-readable storage medium storing a program used for generating an image of an object space viewed from a given viewpoint, the program causing a computer to function as:

a contact event determination section which determines whether or not a contact event in which a first model object and a second model object come in contact in the object space has occurred; and a vertex shader section which moves vertices of a contact plane of the second model object with the first model object when the contact event determination section has determined that the contact event has occurred, wherein a given reference plane is set for the first model object, and height information of a surface of the first model object with respect to the reference plane is set in a grid pattern by using height map data; and wherein the vertex shader section fetches the height information of grid points corresponding to a contact plane of the first model object with the second model object by referring to the height map data, and moves the vertices of the contact plane of the second model object based on the fetched height information of the grid points.

2. The computer-readable storage medium as defined in claim 1, the program causing the computer to function as:

a vertex generation section which generates new vertices of the second model object to increase the number of vertices when the contact event determination section has determined that the contact event has occurred, wherein the vertex shader section moves the vertices of the contact plane of the second model object including the new vertices generated by the vertex generation section so that the contact plane of the second model object is depressed corresponding to the contact plane of the first model object.

3. The computer-readable storage medium as defined in claim 2,
wherein the vertex generation section generates the new vertices only in the contact plane of the second model object when the contact event determination section has determined that the contact event has occurred.

4. The computer-readable storage medium as defined in claim 2,
wherein the vertex generation section generates the new vertices of the second model object only when a contact position of the first and second model objects is in a first distance range from the viewpoint.

5. The computer-readable storage medium as defined in claim 4,
wherein, when the contact position of the first and second model objects is in a second distance range farther than the first distance range from the viewpoint, the vertex shader section sets an inverse vector of a normal vector of each vertex of the contact plane of the first model object as a normal vector of each of the vertices of the contact plane of the second model object.

6. The computer-readable storage medium as defined in claim 5, the program causing the computer to function as:
a pixel shader section which performs texture mapping of a mark representation image on the contact plane of the second model object when the contact position of the first and second model objects is in a third distance range farther than the second distance range from the virtual camera.

7. The computer-readable storage medium as defined in claim 1, the program causing the computer to function as:
a model data change section which, when two or more pieces of second model object model data which differ in level of detail, changes the second model object model data to be fetched by the vertex shader section corresponding to a distance between the viewpoint and a contact position of the first and second model objects.

8. The computer-readable storage medium as defined in claim 7,
wherein the model data change section causes the vertex shader section to fetch the second model object model data with higher level of detail as the distance between the viewpoint and the contact position becomes shorter.

9. The computer-readable storage medium as defined in claim 7,
wherein the model data change section causes the vertex shader section to fetch the second model object model data with high level of detail instead of the second model object model data with low level of detail only when the contact position of the first and second model objects is in a first distance range from the viewpoint.

10. The computer-readable storage medium as defined in claim 1,
wherein the vertex shader section switches two or more pieces of height map data which differ in the height information set for the grid point corresponding to movement information of the first model object, and moves the vertices of the contact plane of the second model object.

11. The computer-readable storage medium as defined in claim 1,
wherein the vertex shader section switches two or more pieces of height map data which differ in a range of the contact plane corresponding to material information set for the second model object, and moves the vertices of the contact plane of the second model object.

12. The computer-readable storage medium as defined in claim 1,
wherein the contact event determination section determines that the contact event has occurred when a first hit check area set for the first model object and a second hit check area set for the second model object have a positional relationship in which the first hit check area overlaps the second hit check area; and
wherein the program causes the computer to function as a hit check area setting section which, when the vertices of the contact plane of the second model object with the first model object have been moved by the vertex shader section, resets the second hit check area set based on the vertex position after the vertices have been moved.

13. A computer-readable storage medium storing a program used for generating an image of an object space viewed from a given viewpoint, the program causing a computer to function as:
a vertex shader section which, when a contact event in which a first model object and a second model object come in contact in the object space has occurred, fetches height information of grid points corresponding to a contact plane of the first model object by referring to height map data in which height information of a surface of the first model object with respect to a given reference plane set for the first model object is set in a grid pattern, and moves vertices of a contact plane of the second model object based on the fetched height information of the grid points.

14. A computer-implemented image generation system which generates an image of an object space viewed from a given viewpoint, the computer-implemented image generation system comprising:
a contact event determination section which determines whether or not a contact event in which a first model object and a second model object come in contact in the object space has occurred; and
a vertex shader section which moves vertices of a contact plane of the second model object with the first model object when the contact event determination section has determined that the contact event has occurred,
wherein a given reference plane is set for the first model object, and height information of a surface of the first model object with respect to the reference plane is set in a grid pattern by using height map data; and
wherein the vertex shader section fetches the height information of grid points corresponding to a contact plane of the first model object with the second model object by referring to the height map data, and moves the vertices of the contact plane of the second model object based on the fetched height information of the grid points.

15. A computer-implemented image generation system which generates an image of an object space viewed from a given viewpoint, the computer-implemented image generation system comprising:
a vertex shader section which, when a contact event in which a first model object and a second model object come in contact in the object space has occurred, fetches height information of grid points corresponding to a contact plane of the first model object by referring to height map data in which height information of a surface of the first model object with respect to a given reference plane set for the first model object is set in a grid pattern, and moves vertices of a contact plane of the second model object based on the fetched height information of the grid points.

16. An image generation method comprising computer-implemented steps of:
   determining whether or not a contact event, in which a first model object and a second model object come in contact in an object space, has occurred;
   moving vertices of a contact plane of the second model object with the first model object when occurrence of the contact event has been determined;
   setting a given reference plane for the first model object, and setting height information of a surface of the first model object with respect to the reference plane in a grid pattern by using height map data; and
   fetching the height information of grid points corresponding to a contact plane of the first model object with the second model object by referring to the height map data, and moving the vertices of the contact plane of the second model object based on the fetched height information of the grid points.

17. An image generation method comprising a computer-implemented step of:
   fetching, when a contact event in which a first model object and a second model object come in contact in the object space has occurred, height information of grid points corresponding to a contact plane of the first model object by referring to height map data in which height information of a surface of the first model object with respect to a given reference plane set for the first model object is set in a grid pattern, and
   moving vertices of a contact plane of the second model object based on the fetched height information of the grid points.

* * * * *